(12) United States Patent
Tucker

(10) Patent No.: US 7,168,666 B2
(45) Date of Patent: Jan. 30, 2007

(54) PORTABLE SUPPORT STRUCTURE

(76) Inventor: Timothy R. Tucker, 366 Oakdale Dr., Rochester, NY (US) 14618

( * ) Notice: Subject to any disclaimer, the term of this patent is extended or adjusted under 35 U.S.C. 154(b) by 0 days.

(21) Appl. No.: 10/744,540

(22) Filed: Dec. 22, 2003

(65) Prior Publication Data

US 2004/0135041 A1    Jul. 15, 2004

Related U.S. Application Data

(60) Provisional application No. 60/436,275, filed on Dec. 23, 2002.

(51) Int. Cl.
*A47G 23/02* (2006.01)
*E04G 1/00* (2006.01)

(52) U.S. Cl. .................. 248/150; 248/166; 182/181.1; 182/224

(58) Field of Classification Search ............... 248/150, 248/166, 170, 440, 440.1, 188, 97, 95, 99; 403/13, 170; 16/225; 211/85.11; 269/902; 182/181, 224, 129, 183, 185
See application file for complete search history.

(56) References Cited

U.S. PATENT DOCUMENTS

| | | | | |
|---|---|---|---|---|
| 438,630 A * | 10/1890 | Lyon | ............................. | 5/116 |
| 441,507 A * | 11/1890 | Sale | ............................. | 5/129 |
| 559,743 A * | 5/1896 | Ormsby | ........................ | 108/25 |
| 2,746,703 A * | 5/1956 | Emery | ........................ | 248/150 |
| 2,896,365 A * | 7/1959 | Ellman | ........................ | 248/464 |
| 3,071,204 A * | 1/1963 | Piltingsrud | .................... | 182/27 |
| 3,483,999 A * | 12/1969 | Barrett | ........................ | 211/204 |
| 4,369,000 A * | 1/1983 | Egnew | ........................ | 403/13 |
| 4,489,808 A * | 12/1984 | Voye | ........................... | 182/155 |
| 4,577,767 A | 3/1986 | Geschwender | | |
| 4,723,741 A * | 2/1988 | Doering | ........................ | 248/97 |
| 4,756,386 A | 7/1988 | Blanchard | | |
| 4,789,070 A * | 12/1988 | Bennett | ........................ | 211/200 |
| 5,085,329 A * | 2/1992 | Crowell et al. | ............. | 211/195 |
| 5,097,546 A * | 3/1992 | Turner, III | ..................... | 5/127 |
| 5,146,635 A * | 9/1992 | Gastle et al. | ................... | 5/620 |
| 5,190,254 A * | 3/1993 | Maguire | ..................... | 248/164 |
| 5,301,910 A | 4/1994 | Lang et al. | | |
| 5,551,178 A * | 9/1996 | Foley et al. | ................... | 40/610 |
| 5,657,703 A | 8/1997 | Johnson | | |
| 5,667,066 A * | 9/1997 | Simpson | ..................... | 206/278 |
| 6,213,555 B1 * | 4/2001 | Sulpizio et al. | ............. | 297/377 |
| 6,406,091 B1 | 6/2002 | Saul et al. | | |
| 6,601,675 B2 | 8/2003 | Gulledge | | |
| 6,814,333 B1 * | 11/2004 | Freiburger | .................... | 248/150 |
| 2004/0262466 A1 * | 12/2004 | Blattner | ...................... | 248/166 |

* cited by examiner

*Primary Examiner*—Anita M. King
(74) *Attorney, Agent, or Firm*—Duane C. Basch; Basch & Nickerson LLP

(57) ABSTRACT

The present invention is a device having at least two strut assemblies joined together to form a free standing support that is both portable and collapsible. Components may be joined to one another by a flexible cord, and a flexible load bearing web to limit the maximum open position. Used in pairs the support device is advantageous for holding articles for work or storage.

15 Claims, 14 Drawing Sheets

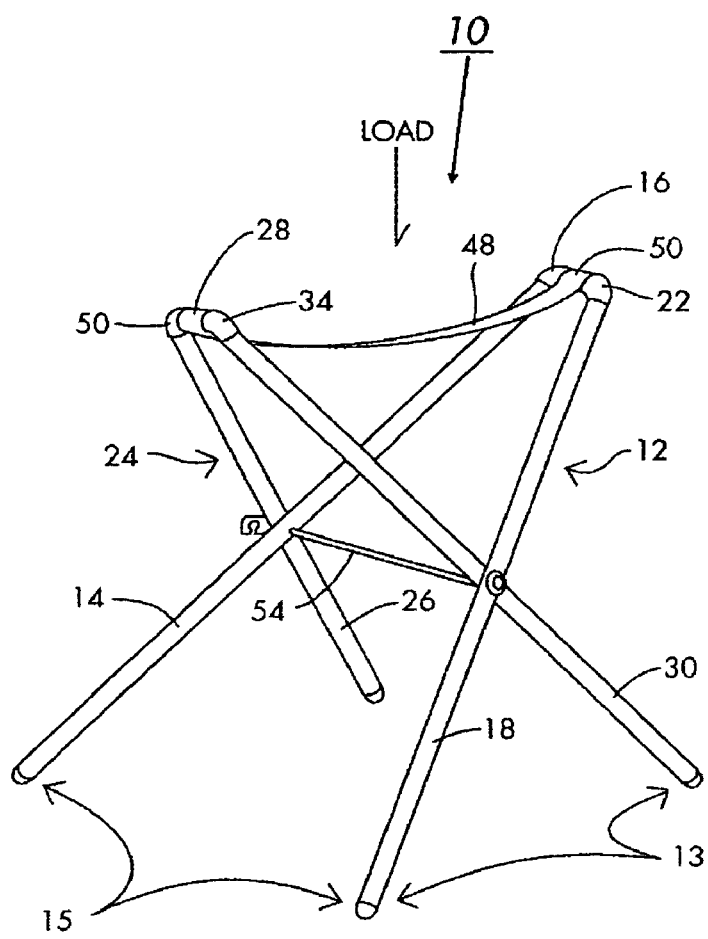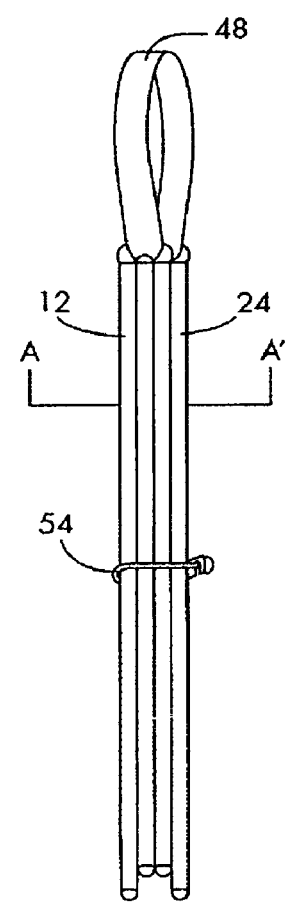
Fig. 1
Fig. 2

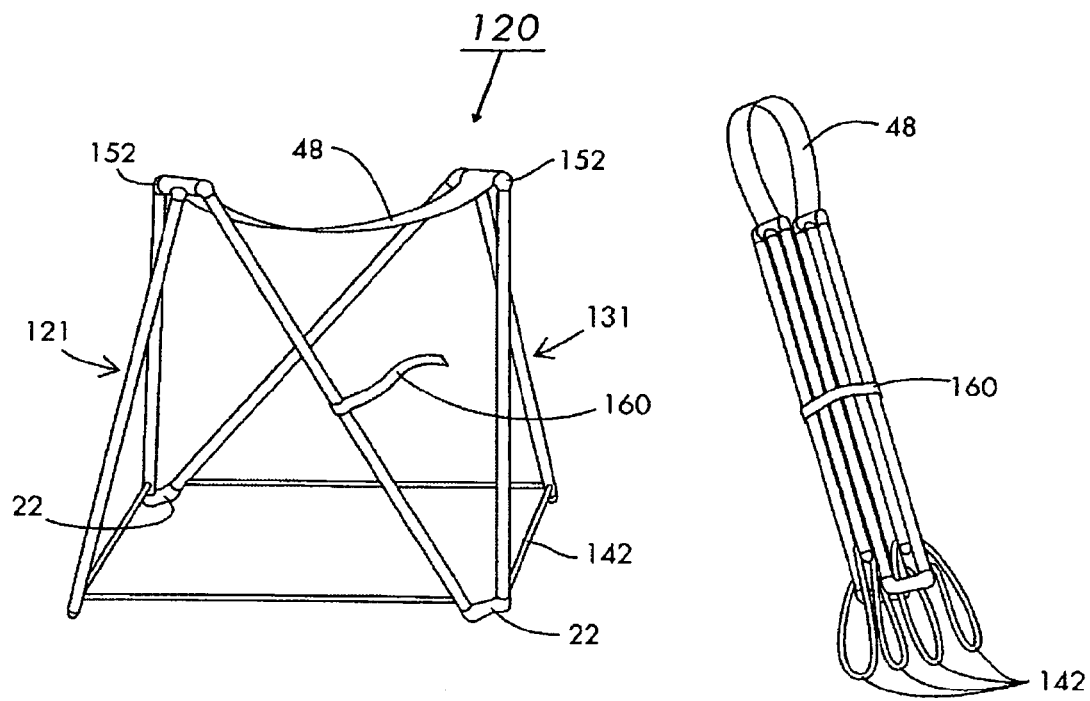
Fig. 13
Fig. 14
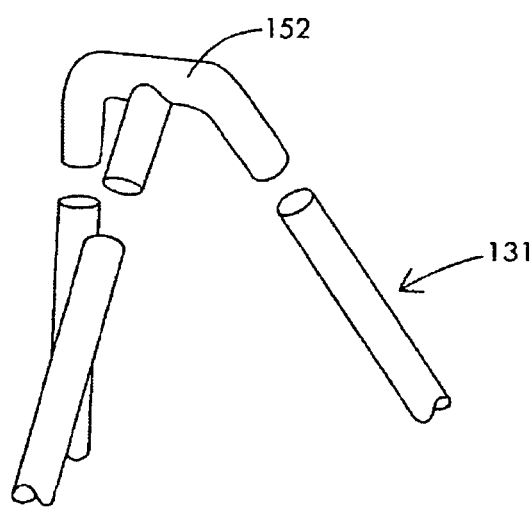
Fig. 15

PORTABLE SUPPORT STRUCTURE

RELATED U.S. APPLICATION DATA

Priority is claimed from Provisional Application No. 60/436,275, filed on Dec. 23, 2002 by Timothy R. Tucker, which is hereby incorporated by reference in its entirety.

This invention relates generally to a collapsible, self supporting device for remote and occasional recreational use and more particularly to an assembly that extends from a portable state to support various objects off the ground.

BACKGROUND AND SUMMARY OF THE INVENTION

The present invention is a collapsible support structure having a highly portable form factor that is a compact, generally rectangular shape when collapsed, and a geometrically stable structure when in use.

There is a general need in many settings for a lightweight, inexpensive collapsible device, which has the stability to serve a multitude of support purposes. Such settings could be parks, campgrounds, waterfront recreational sites, storage facilities, sporting meets, exhibits, shows, as well as a general purpose stanchion for supporting items at a work site. Furthermore, the specific utility of such a collapsible device could be used as a stool, or in pairs as a sleeping cot, as well as for support of recreational items such as kayaks, camping gear, and the like, or possibly providing the support for a work surface or a cot for sleeping or to hold tools, signs, and construction materials at a work sites.

In accordance with the present invention, there is provided a portable collapsible support structure whereby in the open position opposing forces from the load provide a free standing, stable structure. The erection of the support structure results in the opposition of the two opposing forces and thereby produces a fixed and stable structure without the need to adjust, tighten, or insert bolts, pins or cords. Accordingly the simplicity of the current invention over the prior art enhances reliability, utility and cost of manufacturing.

Representative problems encountered with the use of previously known support structures include the need for excessive interacting componentry, limitations on the collapsed to open ratio, difficulty in opening/closing and lack of rigidity. Numerous known devices implement designs for a portable and collapsible structure. For instance, U.S. Pat. No. 5,657,703 describes a portable work station having an attached table top. U.S. Pat. No. 5,301,910 describes an "X" shaped support structure that is collapsible. These designs incorporate hinges with pins, spring-loaded members, and securing devices to secure the apparatus in the open and/or closed position. The present invention is collapsible without requiring any actions other than removing the load and lifting from the ground. Accordingly the present invention can be deployed using one hand and closed in the same manner and is therefore easier to use and most convenient for the aforementioned purposes.

A general object of the present invention is to provide a generic collapsible structure that is readily erected to a stable stanchion having a base perimeter dimension generally larger than the supporting surface area.

Another object of the invention is a support structure that can be collapsed into a relatively small package without sacrificing the rigidity and strength of the structure in its open position.

A further objective of the invention is to provide a collapsible structure that may be maintained in an open position, absent any locking mechanisms.

A feature of the invention is to provide two or more support structures that are light and easy to carry and can be used in combination to provide a stable support base for a multitude of objects.

It is a specific object of the invention to provide a structure that is easily stored and transported and opens to enable the secure holding and placement of work and/or recreational articles.

In accordance with an aspect of the present invention, there is provided, a support device comprising: a first assembly, said first assembly including two struts pivotally connected along a midsection thereof so as to form an angle therebetween; and a second assembly having two struts connected to one another so as to form an acute angle therebetween, wherein an end of each strut in the first assembly is connected to an end of each strut in the second assembly at a vertex to form the supporting device.

In accordance with another aspect of the present invention, there is provided, a work support system for supporting a load thereon, comprising: at least two supporting devices, each supporting device including a first assembly, said first assembly including two struts pivotally connected along a midsection thereof so as to form an angle therebetween, and a second assembly having two struts connected to one another so as to form an acute angle therebetween, wherein an end of each strut in the first assembly is connected to an end of each strut in the second assembly at a vertex to form the supporting device; and a web spanning between vertices where the ends of each strut in the first assembly are connected to the ends of each strut in the second assembly; wherein the load is positioned so as to be supported at opposite ends thereof by each supporting device.

In accordance with yet a further aspect of the present invention, there is provided a method for constructing a collapsible, portable support device, comprising: creating a first assembly including two struts by pivotally connecting the struts along a midsection thereof so as to form an angle therebetween; and creating a second assembly using two struts by connecting one to the other so as to form an acute angle therebetween, and connecting an end of each strut in the first assembly to an end of each strut in the second assembly at a vertex to form the supporting device.

In accordance with an aspect of the present invention, there is provided a collapsible structure, comprised of: a first strut assembly comprising a first pair of struts joined by a first coupling to form an apex between said first pair of struts, a second strut assembly comprising a second pair of struts joined by a second coupling to form an apex between said second pair of struts, wherein the first strut assembly is pivotably joined to the second strut assembly, thereby forming a first joint between the first strut of the first pair of struts and the first strut of the second pair of struts, and a second joint between the second strut of the first pair of struts and the second strut of the second pair of struts, and wherein the first joint is joined to the second joint by a flexible cord, and wherein the first coupling of the first strut assembly is joined to the second coupling of the second strut assembly by a flexible web.

BRIEF DESCRIPTION OF THE DRAWINGS

FIG. 1 is a perspective view of one embodiment of a freestanding support structure in an open and unloaded state according to the present invention;

FIG. 2 is a perspective view of the embodiment in FIG. 1 in a folded or collapsed state;

FIG. 8b is an exploded partial perspective view of the cross-hinge and cord of an alternative embodiment of FIG. 8a;

FIG. 13 is a three-into-one strut assembly embodiment intended for heaver weight loading;

FIG. 14 is the embodiment in FIG. 13 in a folded and secured configuration;

FIG. 15 is a detail view of the flexible three-way coupling device used in accordance with the embodiments of FIG. 13 and FIG. 14;

DETAILED DESCRIPTION OF THE PREFERRED EMBODIMENT

Figures 3, 4:
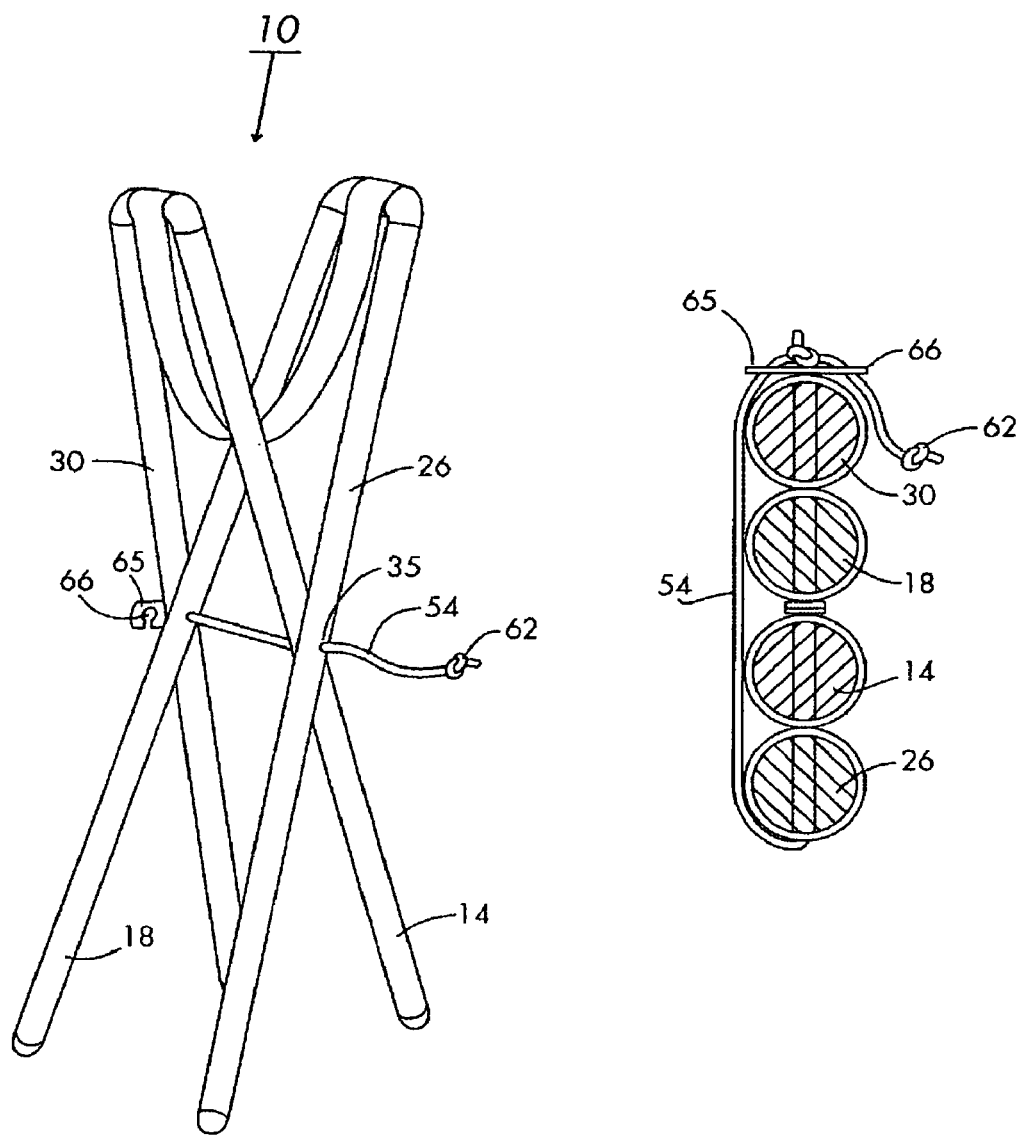
FIG. 3 is a perspective view of the embodiment of FIG. 1, shown in an almost fully folded or collapsed state.
FIG. 4 is a cross-sectional view taken along lines A–A' of the embodiment depicted in FIG. 2.

For a general understanding of the freestanding support structure, reference is made to the drawings.

Referring now to the drawings wherein the same reference numerals are used to identify similar components in the different figures, and referring to FIG. 1 in particular, there is shown a perspective view of an embodiment of a freestanding, collapsible support structure 10 in its open and unloaded state. More specifically, the support structure 10 may be used in pairs to support each end of a piece of sporting equipment. The load supported by the structure 10 can be a canoe, kayak or other personal watercraft, as well as a surfboard, sailboard, snowboard, skis, sail rigging or any like-weighted load with dimensions such that its length is substantially greater in comparison to its width and height. The structure 10 lends itself to the support of such equipment that should be kept elevated from the ground or floor when not being used or when performing maintenance.

Referring again to FIG. 1, in the embodiment shown, the structure 10 includes a first strut assembly 12 comprising a strut 14 connected at its upper end 16 to a strut 18 at its upper end 16 by means of a flexible coupling 22, such that the apex of the assembly 12 is formed at coupling 22. The structure 10 also includes a second strut assembly 24 comprising a strut 26 connected at its upper end 28 to a strut 30 at its upper end 28 by means of a flexible coupling 34, such that an apex of the assembly 24 is formed at coupling 34. It will be appreciated that in order to encourage the flexible coupling to move to a nominal open position or configuration, the coupling may be spring loaded or an additional spring member may be added along the apex so as to bias or move the apex to its open position. The struts 14, 18, 26 and 30 may be manufactured from materials such as wood, metal, plastic and the like having a cross-section of any geometry with sufficient beam strength. The flexible couplings 22 and 34 may be of one-piece construction or they may be articulated assemblies of components made from wood, metal, plastic, rubber and the like having a cross-section profile of any geometry that provides the required flexure of approximately 45 degrees. The couplings and struts are joined to one another by means of friction, adhesive, welding, fasteners, etc. In the embodiment of FIG. 1, the "relaxed" or nominal positions of the flexible couplings 22 and 34 occur when the structure 10 is in the opened state, as depicted in FIG. 1 whereas a bending moment is applied to the coupling through the struts and the coupling is flexed and in tension while in the closed position. The kinetic energy stored in the flexed coupling is believed to be advantageous to readily open the structure when desired.

Figure 8A:
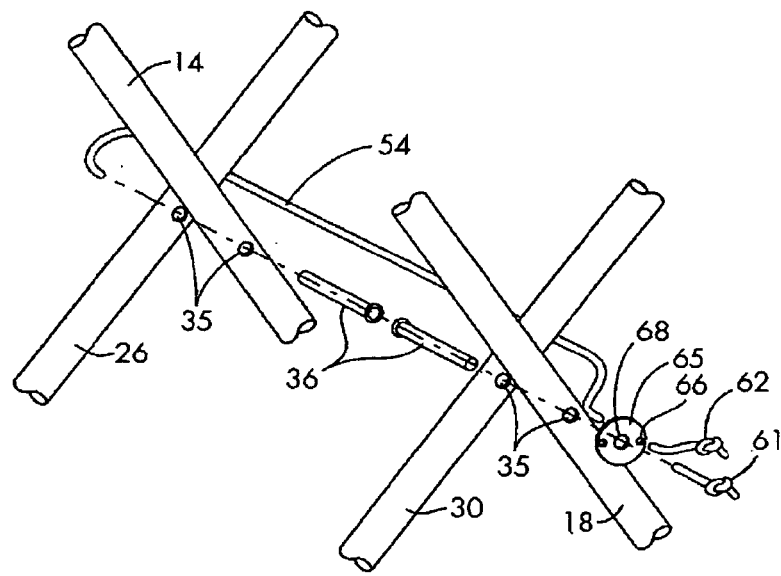
FIG. 8a is an exploded partial perspective view of the cross-hinge and cord of the embodiment of FIG. 1.
Figure 8B:
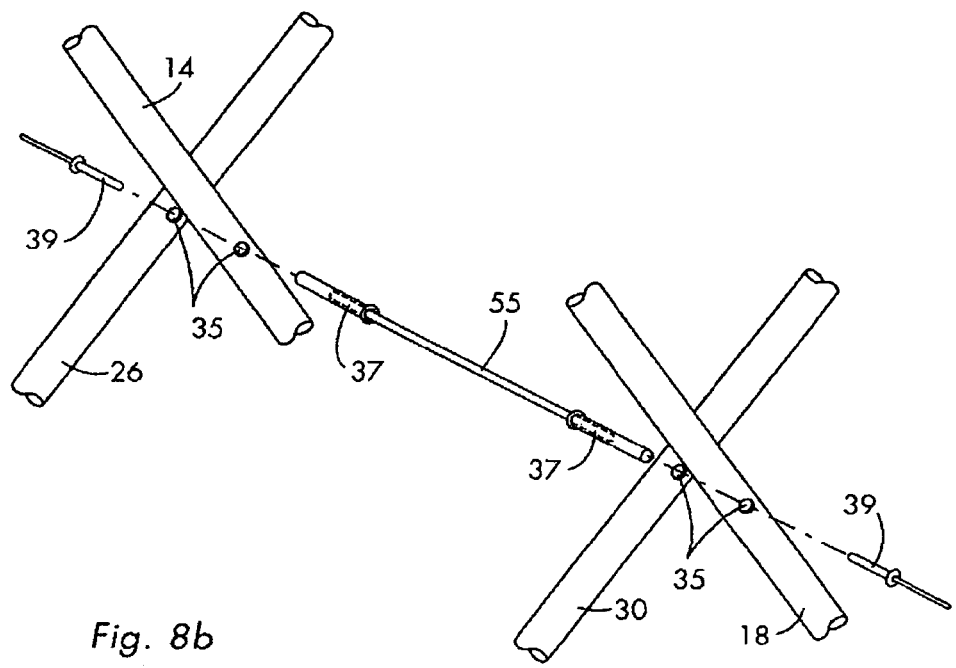

Referring now to FIG. 8a, in the embodiment shown, strut 14 is pivotably joined to strut 26, by means of a hollow rivet or tubing 36 passing through hole 35 in struts 26, 14, 18 and 30. Other means of joining the struts, such as pins, fasteners, dowels, hinges, and the like may also be used. In this embodiment, each of the struts 14, 26 and struts 18, 30 are free to rotate relative to the other, by pivoting about the joining hollow rivets 36. 1 none embodiment as shown in FIG. 8b a rivet like tube 37, having a flare on one end, is partially inserted and secured over each end of cord 55 and placed into hole 35. An expansion rivet 39, such as a commercially available Pop-Rivet®, is inserted into the other end of tube 37 having cord 55 attached thereto. Cord 55 is mechanically secured within flared tube 37 with barbs formed into the tube and/or an adhesive material.

As shown in the drawings of FIGS. 1, 2, 3 and 4 cord 54 provides a dual function. In the open position cord 54 is placed in tension and limits the opening 15 in FIG. 1 to a pre-determined size, while in the folded and portable configuration cord 54 is pulled through rivets 35 and cinches the two strut assemblies 12 and 24 of the support structure 10 into a minimal package as shown in FIG. 2. One end of cord 54 in FIG. 8a is secured within the cord bracket 65, comprising a member with a center hole 68 and a pair of slots 66. Bracket 65 can be secured to strut 18 and 26 by hollow rivet 36 or by other conventional means, such as fastener(s), adhesives, welding, etc. FIG. 3 demonstrates the midway open/close position as cord 54 is drawn through hole 35. The closure of assembly 10 is thereby implemented by pulling on knot 62 of cord 54 in FIG. 3 and wrapping the excess cord around the strut assembly and securing said knot 62 within slots 66 of bracket 65 as depicted in the cross-sectional view of FIG. 4.

Referring to FIG. 2, there is shown a perspective view of the same embodiment depicted in FIG. 1, in which structure 10 is now in a folded state. When structure 10 is folded, cord 54 may be wrapped around the nested struts and then the knotted end 62 of cord 54 may be secured in the slot 66 of bracket 65 to prevent the nested strut assemblies 12 and 24 from separating from each other. It will be appreciated that when the structure 10 is in its folded state, the strap 48 may also serve as a carrying handle. As an alternative to wrapping the cord about the struts to maintain the structure in a folded state, it is also possible to use a rubber member in the shape of an "8" to loop over the ends of at least two of the struts to hold the ends together and thereby retain the structure in a folded state.

Referring again to FIG. 1, the coupled end of strut assembly 12 may be separated from the coupled end of strut assembly 24 wherein strap 48, being of a fixed or adjustable length, determines the maximum distance 13 between the ends of strut assemblies 12 and 24, when separated. It can be seen that the maximum size of the load being supported by structure 10, as well as the desired height of the supported load is directly related to the length of strap 48. The ends of strap 48 may be terminated into closed loops 50 so as to enable the rotation around flexible couplings 22 and 34, or in the alternative strap 48 can be secured directly to the couplings 22 and 34 by means of a screw, adhesive or a clamp arrangement. It should be understood that the same limiting function of strap 48 can be accomplished with various alternative means, including a rigid limiter, provided one end is removable or the rigid member contains two or more hinged links.

Referring again to FIG. 1 it is noted that the fulcrum position formed by the four rivet holes 35 along struts 14, 18, 26 and 30, relative to the strut ends, is a distance determined by the moment required to sustain the free standing structure 10 in equilibrium with the load applied.

Referring now to strut assemblies 12 and 24 and their respective flexible couplings 22 and 34 in FIG. 1, it should be appreciated that structure 10 may rest on any nominally horizontal surface. However, such a surface is not required to be precisely horizontal and/or coplanar because coupling 22 and 34 are flexible in all directions, accordingly the surface upon which structure 10 is deployed may be somewhat irregular. For example, strut 18 may rest upon a portion of irregular ground which is higher or lower vertically than the ground upon which struts 14, 26, and 30 rest, with the overall structure 10 being deployed on the ground in a stable manner. Such a qualification of compliancy is considered a significant advantage in the use of a free standing support structure within the intended environment.

The footprint, or included area beneath structure 10 in FIG. 1 is typically larger than the distal support area by virtue of the inward cant of the struts and strut assemblies. It should be noted that the downward force projections of the struts provide an inward force vector due to the inclined angles of the struts formed between their vertices and the point of contact at the ground. This inward inclination of the struts provides a pyramid-shaped structure that is well known for stability.

With the support structure 10 having been described in FIGS. 1–4, there is shown in FIG. 8a a partial detailed exploded view of a typical embodiment of the hinge or pivot attachment mechanics of the support structure 10. A knot 61, or similar captive device, in an end of cord 54 prevents the cord end from pulling through hollow rivets 36 as it passes through both of the hollow rivets 36. The loose end of cord 54 is then inserted into an open-ended slot 66 of cord bracket 65 as cord 54 traverses snugly across the nested struts 14, 16, 26 and 30. In the depicted embodiment, the width of slots 66 are made smaller than the diameter of cord 54, so that when cord 54 is disposed therein, it is tightly pinched within and is thus prevented from pulling back through such slots and loosening.

Figure 5:
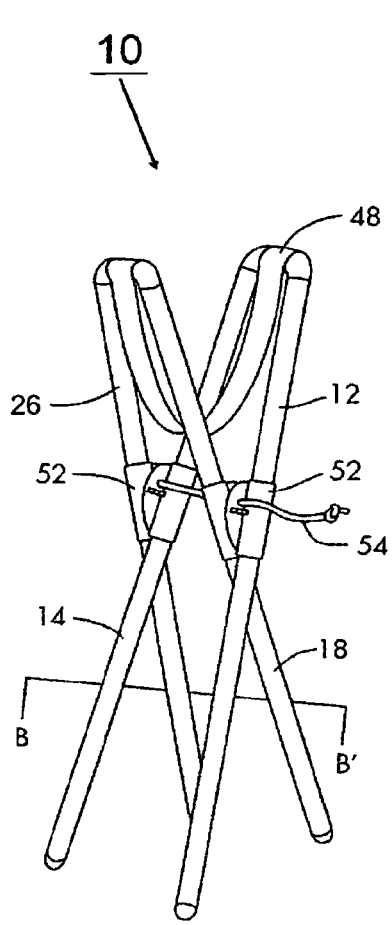
FIG. 5 is a perspective view of a partially closed alternative embodiment of the present invention having a variation to the cross hinge.
Figure 6:
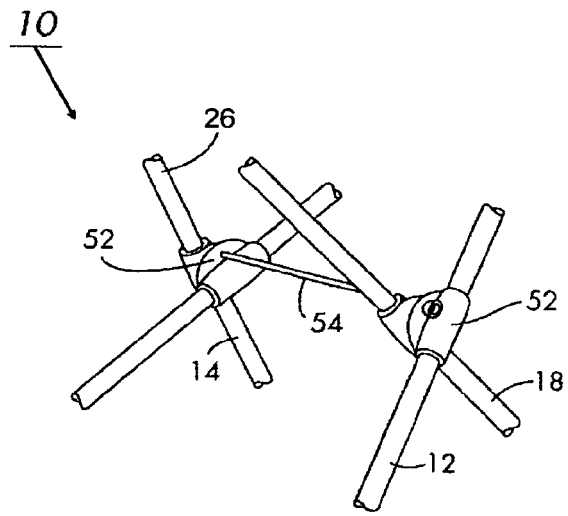
FIG. 6 is a partial view showing the structure of FIG. 5 in an open position.
Figure 7:
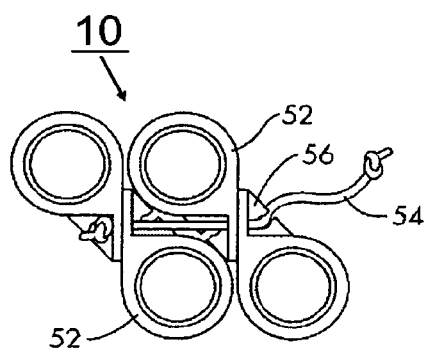
FIG. 7 is a cross-sectional view taken along lines B–B' of the structure in FIG. 5 in a folded state.

The foregoing detailed description of the support structure 10 is shown in an alternative embodiment in FIGS. 5–7 where the joining of the strut assemblies is accomplished without placing hole 35 in each of the four struts. This elimination of the hole provides additional strength along the strut connection region as well as the addition of collar 52 over struts 12, 14, 18 and 24. A pair of collars 52 are connected by cord 54 inserted through a dedicated hole in each collar 52. In the closed position cord 54 is secured in slot 56 thereby retaining structure 10 in the closed position. In an alternative embodiment a fastener is used as a fulcrum, such as a rivet, and cord 54 may pass through the same hole or a separate hole (not shown).

Figure 9:
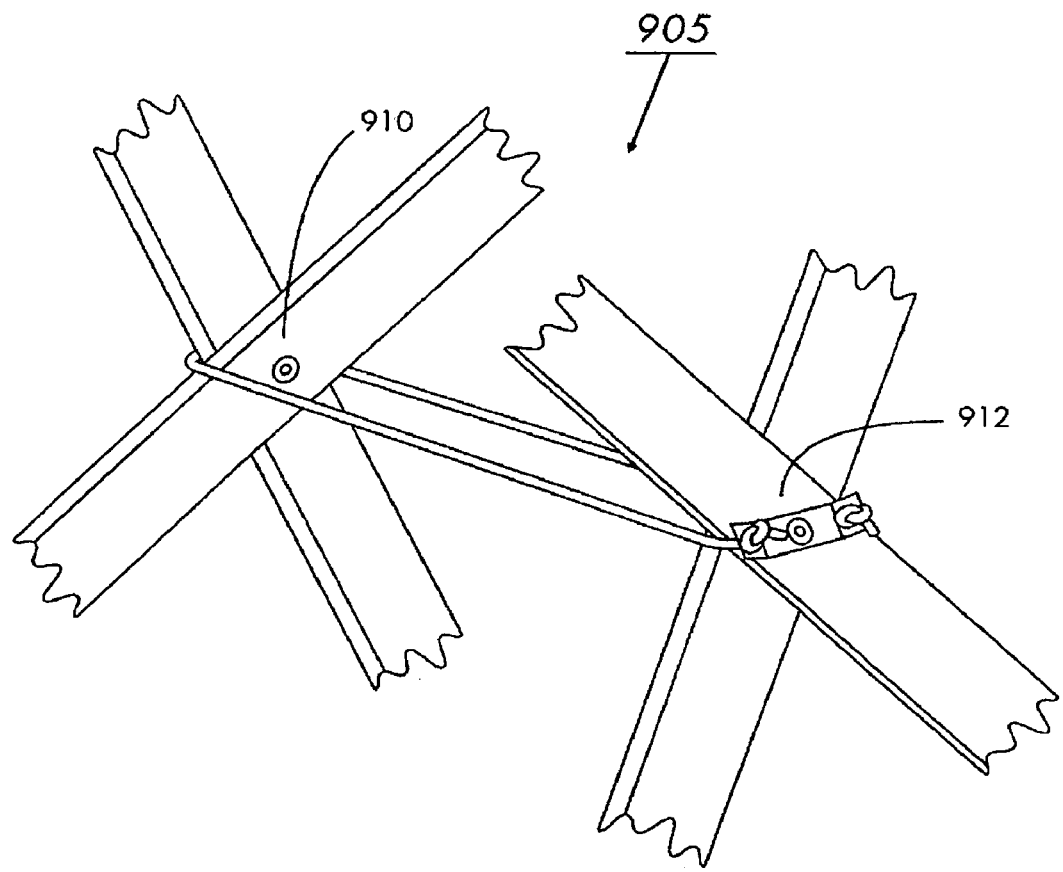
FIG. 9 is a partial perspective view of an alternative cross-hinge configuration where the struts are made of stock having a rectangular cross-section.
Figure 10:
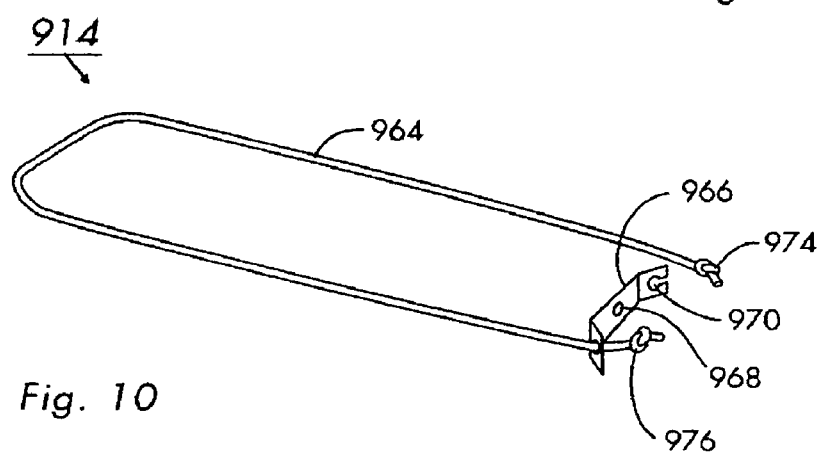
FIG. 10 is a view of the cord and cinch used with the cross-hinge in FIG. 9.

Referring next to FIG. 9, there is illustrated a perspective view of another embodiment of the support structure comprising a pair of strut assemblies 910 and 912 joined to each other to form substantially the same strut assembly as depicted in FIG. 1. In one embodiment strut assembly 910 and 912 are fabricated from standard wooden boards or slats but may be of any suitable material such as plastic, metal or composite. A supporting cord assembly 914, as depicted in FIG. 10, provides a tension member to predefine the opening between strut assemblies 910 and 912. Cable assembly 914 comprises cable 964 and cable clip 966. Cable clip 966 comprises a bar with a hole 968 therethrough, and a slot 970. Cable 964 is disposed through a hole of cable clip 966, and provided with a first knotted end 976. In use a cable assembly is disposed around strut assemblies 910 and 912, with a second knotted end 974 of cable 964 being engaged with cable clip 966 in slot 970. When structure 905 is deployed and supporting a load (not shown), cable 964 is in tension, and thus provides additional load bearing capacity to structure 905. When structure 905 is collapsed (not shown), cable assembly 962 may be wrapped around the collapsed structure 905 in much the same manner as shown for cord 54 and cord clip 65 of FIG. 8a.

Figures 11, 12:
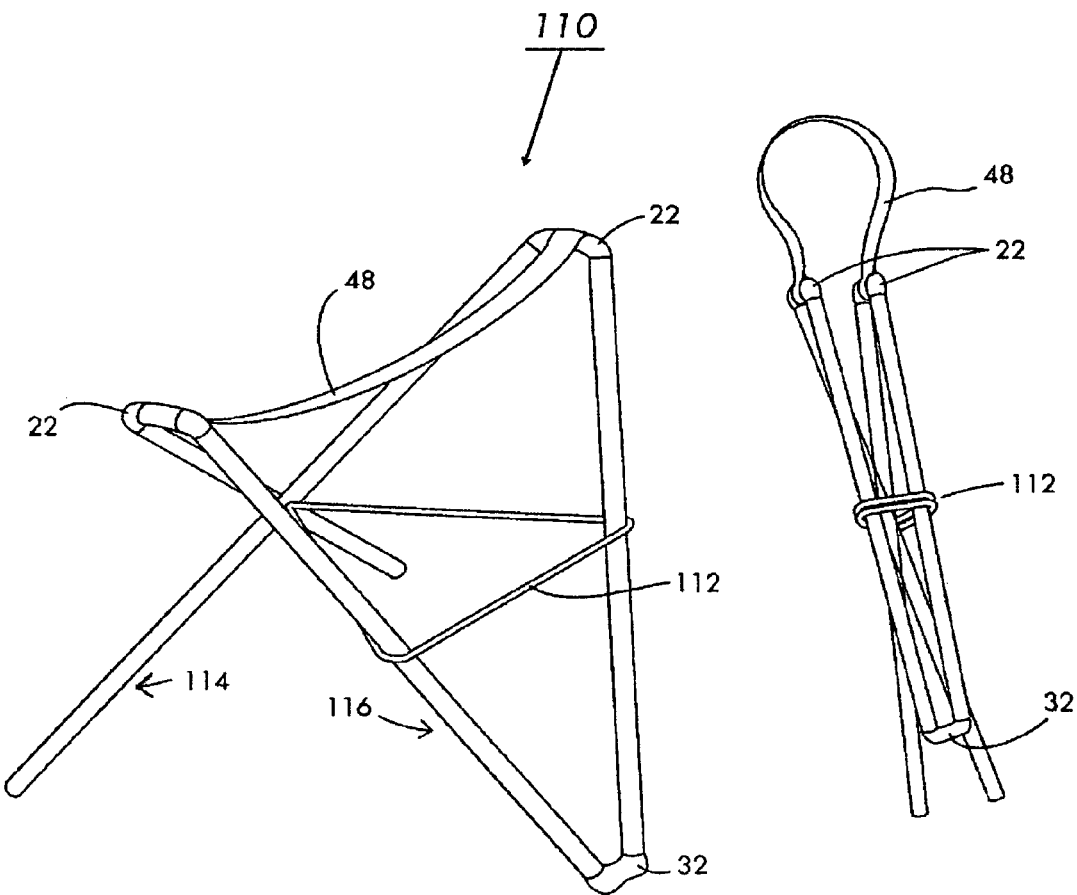
FIG. 11 is an alternative embodiment of the present invention in an open and unloaded state.
FIG. 12 is a perspective view of the embodiment of FIG. 11 shown in the folded or collapsed state.

Yet another embodiment is shown in FIG. 11, where there are two dissimilar strut assemblies 114 and 116 connected with coupler 22 to form a three point-of-contact support structure 110. Strut assembly 114 comprises a pair of struts pivotably connected along the mid-section thereof. Strut assembly 116 also comprises a pair of struts, however ends of the struts are flexibly joined with coupler 32 at the point of contact with the ground. The opposite ends of the struts in assembly 116 are flexibly coupled to the ends of the corresponding struts in strut assembly 114. Cord 112 is inserted through the connection point of strut assembly 114 and encircles strut assembly 116 to limit the opening between the two assemblies to a pre-determined position. Coupler 22 flexibly joins strut assemblies 114 and 116 and provides an attachment point for strap 48.

The structure 110 as depicted in FIG. 11 is now shown in FIG. 12 in a folded state. When structure 110 is folded cord 112 may be wrapped around the nested struts to prevent them from separating from one another. It will be appreciated that when structure 110 is in the folded state that strap 48 may also serve as a carrying handle.

Referring now to FIG. 13, there is shown a perspective view of an embodiment of a freestanding support structure 120 in its open and unloaded state. More specifically, the freestanding support structure 120 is capable of supporting a heavier load in much the same manner as the structure depicted in FIG. 1. A pair of tri-strut assemblies 121 and 131 are connected to one another by means of flexible couplings 22 at the point of contact with the ground and at least one strap is disposed between and joined to top couplings 152. FIG. 14 is an illustration of the embodiment of FIG. 13 in a folded or collapsed state as described below. Referring also to FIG. 15, there is shown a partial exploded view of the tri-strut assembly 152. In this view, tri-strut assembly 121, or 131, are connected at their respective upper ends with a flexible coupler 152.

In the open position the support structure 120 base footprint is limited by cord 142 which is affixed to each of the four points of contact with the ground. Cord 142 has a predetermined length to provide the optimum stability and height for support structure 120.

Referring to FIG. 14, there is shown a perspective view of the same embodiment depicted in FIG. 13, in which structure 120 is shown in a folded state. When structure 120 is folded, a removable adjustable flexible securing strap 160 may be wrapped snugly around the nested struts assemblies 121 and 131. Strap 160 may be made of rubber, flexible fabric, leather or similar material and cinched using a mechanical fastener or a hook/pile binding material such as Velcro®. It can be appreciated that when the structure 120 is in its folded state, strap 48 may serve as a carrying handle.

Figure 16:
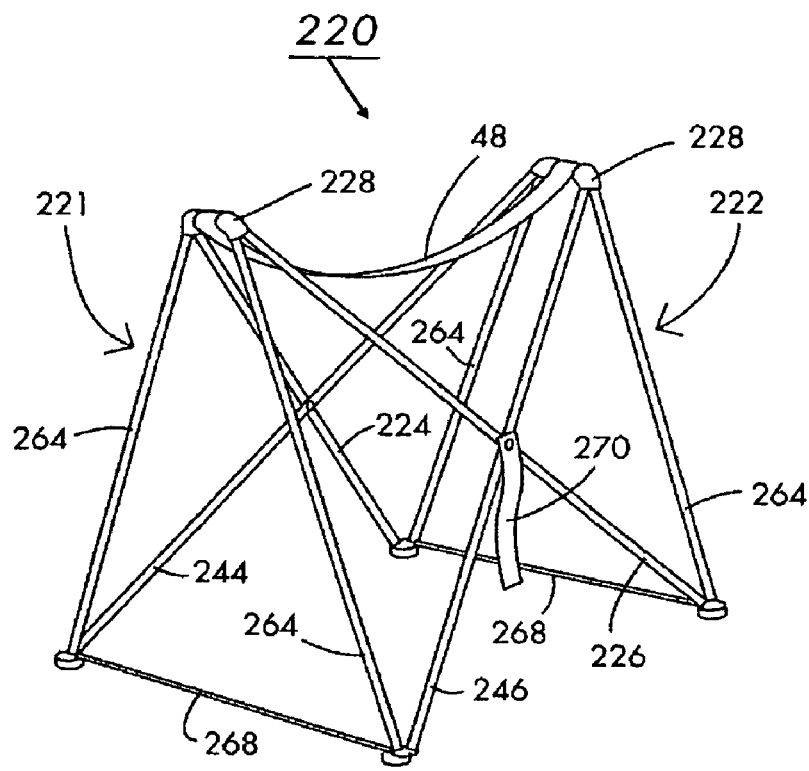
FIG. 16 is a perspective view of the embodiment shown in FIG. 1 with the addition of four limiters to secure the open position.

Now referring to FIG. 16, there is shown a perspective view of an embodiment of a freestanding support structure 220 in its open and unloaded state. More specifically, the freestanding support structure 220 may be used to support a heavier load of similar equipment than the embodiment depicted in FIG. 1 by utilizing similar geometry, while adding supplemental restraints 264 and 268 to maintain the fully open position. Structure 220 comprises a first strut assembly 221 and a second strut assembly 222. Strut assemblies 221 and 222 are substantially identical in construction. The structure 220 also includes a flexible strap 48, of fixed or adjustable length, which links the strut assemblies 221 and 222 at their coupled ends and provides a load bearing surface for a supported item. Strut assembly 221 comprises struts 224 and 244, which are flexibly connected at their respective upper ends to couplings 228. Strut assembly 222 comprises struts 226 and 246. which are also flexibly connected at their respective upper ends to couplings 228. Also connected to the flexible coupling 228, adjacent to the connections of the struts, are limiting shafts 264, having disposed therewithin a stretchable cord assembly 236 as depicted in FIG. 17.

Figure 17:
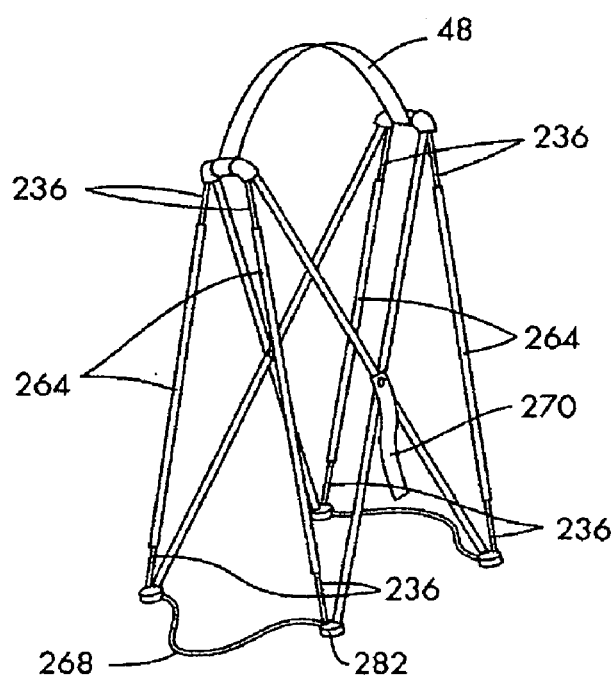
FIG. 17 is a perspective view, in the partially closed configuration, showing the limiters of the embodiment of FIG. 16 in an expanded state.
Figure 18:
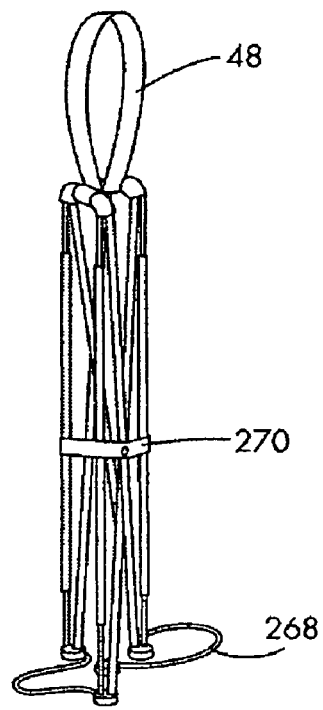
FIG. 18 is a perspective view of the embodiment of FIG. 17 in the folded and secured configuration.

Referring also to FIG. 17, there is shown a perspective view of the embodiment of FIG. 16 in a partially folded state, in which the cord assemblies 236 are partially stretched. The hollow shafts 264 are floating relatively free along the longitudinal axes of the cord assembly 236. Next, referring to FIG. 18, there is shown a perspective view of the embodiment of FIG. 17 in a completely folded and portable state. It should be appreciated that when the structure 220 is in its folded state, the strap 48 may serve as a carrying handle. The nested struts may be snugly wrapped by a flexible securing strap 270, which prevent the individual struts from separating. The strap 270 may be made of rubber, fabric, leather and secured with a mechanical fastener or a hook and pile fastener.

Figure 19A:
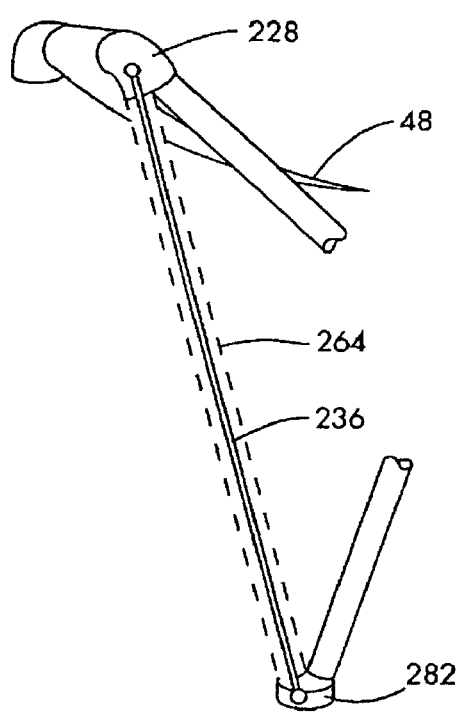
FIG. 19a is a detailed, cutaway view of the limiters illustrated in FIG. 16 to maintain a pre-determined open position.
Figure 19B:
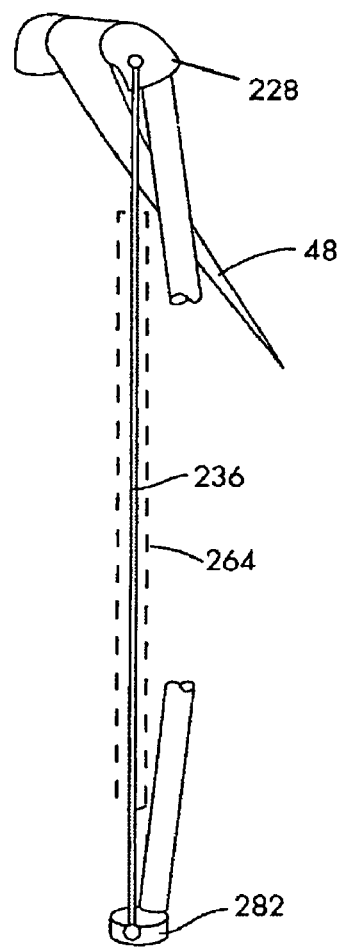
FIG. 19b is a detailed, cutaway view of the limiters illustrated in FIG. 16 in the extended and closed position.
Figure 20:
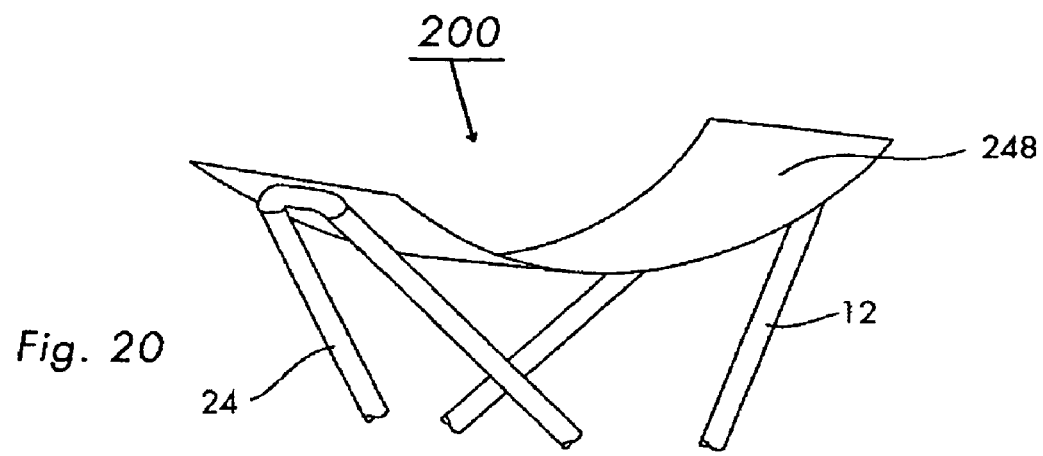
FIG. 20 is a partial perspective view of the free standing support structure of FIG. 1 configured as a stool for sitting

Referring to FIG. 19a, depicted is a cut-away detailed view of the stretchable cord assembly 236 and of the additional supporting shafts 264 when the structure 220 is in its open state. Cord assembly 236 is joined to coupler 228 at the upper end thereof, and stretchable cord assembly 236 is joined to foot 282 at the lower end thereof. Stretchable cord assembly 236 may be freely slidable through hollow limiting shaft 264, and may be removably anchored at its upper end to receiving device(not shown), which receiving device may be fixed or removably constructed within coupling 228. The upper ends of cord assembly 236 may be configured as a spherical ball, hook, loop or similar means for removably connecting to coupler 228. Coupler 228 may be configured so as to releasably capture the ends of cord assembly 236, by means of a socket, eyelet, pin and the like. In like manner the lower end of cord assembly 236 may be configured as a spherical ball, hook, loop or similar means for removably connecting to foot 282. To close the support structure cord 236 is stretched to a length approximately equal to the length of any one strut, as shown in FIG. 19b Referring now to FIG. 20, there is shown an alternative embodiment 200 of a structure that is similar to that of structure 10 of FIG. 1, with the exception that strap 48 of structure 10 is replaced or supplemented by sheet 248 of a concave and semi-rigid material. The concave sheet 248 may be of one piece manufacture, or it may be assembled of components made of natural or manmade fabric, plastic and similar materials, suitable in strength, flexibility and workability, and of such geometric proportions so as to support an adult or child in a seated position.

Figure 21:
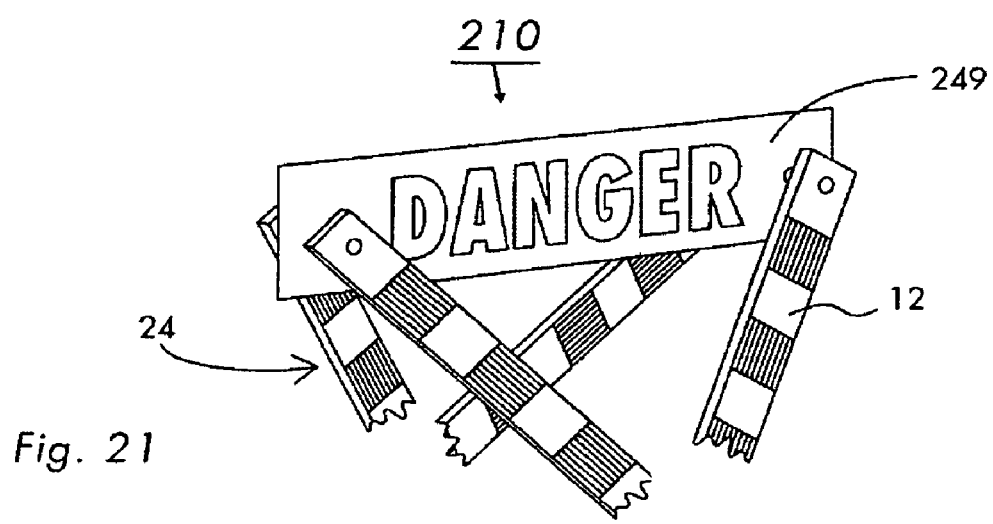
FIG. 21 is a partial perspective view of the free standing structure in FIG. 1 in use as a sign holder.

Turning to FIG. 21, there is shown an embodiment 210 of a structure that may be used as a safety sign at a construction site, for example. The flexible printed web 249 is of a material that joins the strut assemblies 24 and 12 could be formed such that when sign embodiment 210 is deployed, web 249 is held in tension and disposed in a substantially vertical plane. Web 249 can be printed with words of caution, hazard warnings, international warning icons, advertisements, directions, solicitations to enter an establishment, and the like.

Figure 22:
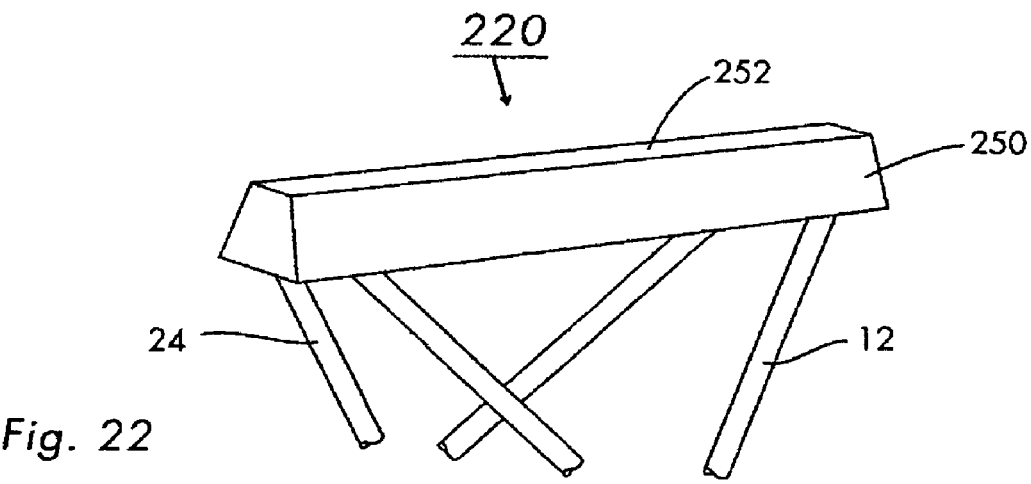
FIG. 22 is a partial perspective view of the free standing support structure configured as a saw horse structure.

In FIG. 22, there is shown yet another embodiment 220 of the structure that is similar to structure 10 of FIG. 1, except that strap 48 of structure 10 is replaced by a separate inverted trough-like cross support member, whereas support 250 captivates the ends of strut assembly 24 and 12 so as to limit the open position as a function of the length of support 250. Cross support 250 is formed with end caps such that flexible couplings 34 and 22 (see FIG. 1) of strut assemblies 24 and 12 are firmly engaged with cross support 250 when structure 220 is supporting a load. The component parts of the structure 220 are of sufficient structural strength so as to hold a load similar to that supported by a typical sawhorse in a workshop or construction site environment. Support 250 may be manufactured of wood, metal, plastic or such materials of suitable strength, dimensional stability and workability so as to support one end of a work piece, the other end of which may rest on the supporting portion of a table saw, work bench, or a second structure 220.

In a further embodiment (not shown), cross support 250 can be modified to comprise at least one roller assembly disposed therein, with the upper surface of the rotatable roll of the roller assembly extending through the upper surface 252 of cross support 250. The rotational axis of the roll of the roller assembly is substantially parallel to the long axis of cross support 250, such that a work piece may be both vertically supported by structure 220 and allowed to traverse cross support 250 in a direction perpendicular to the long axis of cross support 250.

Figure 23:
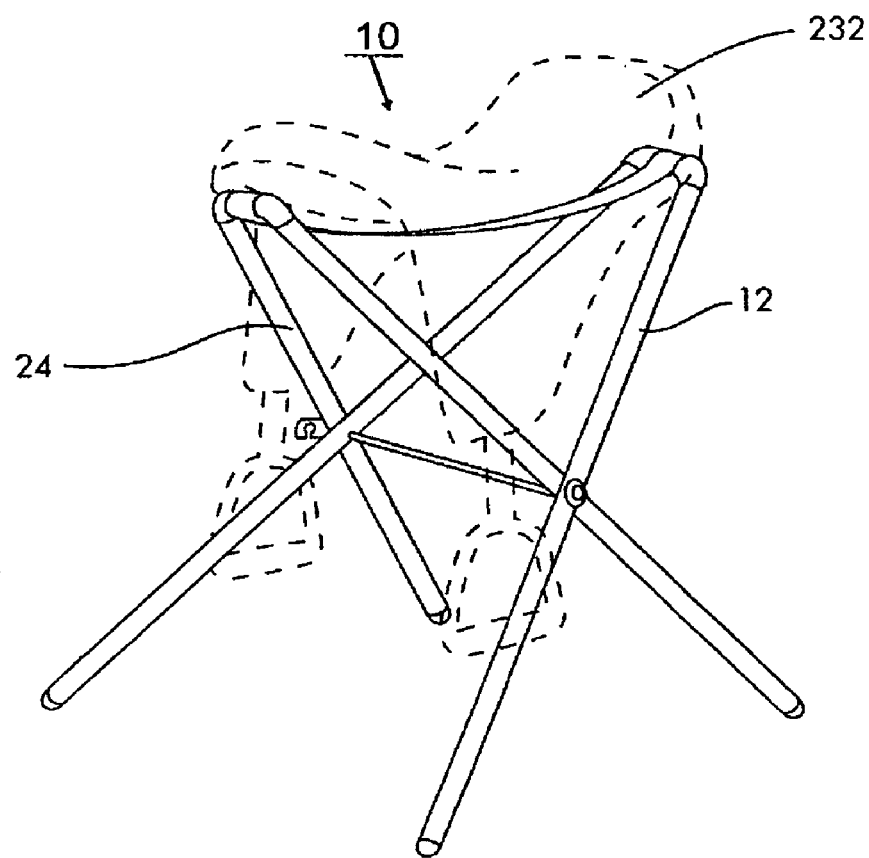
FIG. 23 is a perspective view of the free standing support structure in use as a saddle storage device.

Again, in FIG. 23 the applicant further discloses the utility of structure 10 as it might be used in the storage of an equestrian saddle 232. In this embodiment it may be desirable to construct strut assemblies 12 and 24 from lumber or simulated lumber materials, such as 1×3 inch boards as depicted in FIG. 21. The boards present an appearance distinct from the metal tubes in this specific application.

Figure 24:
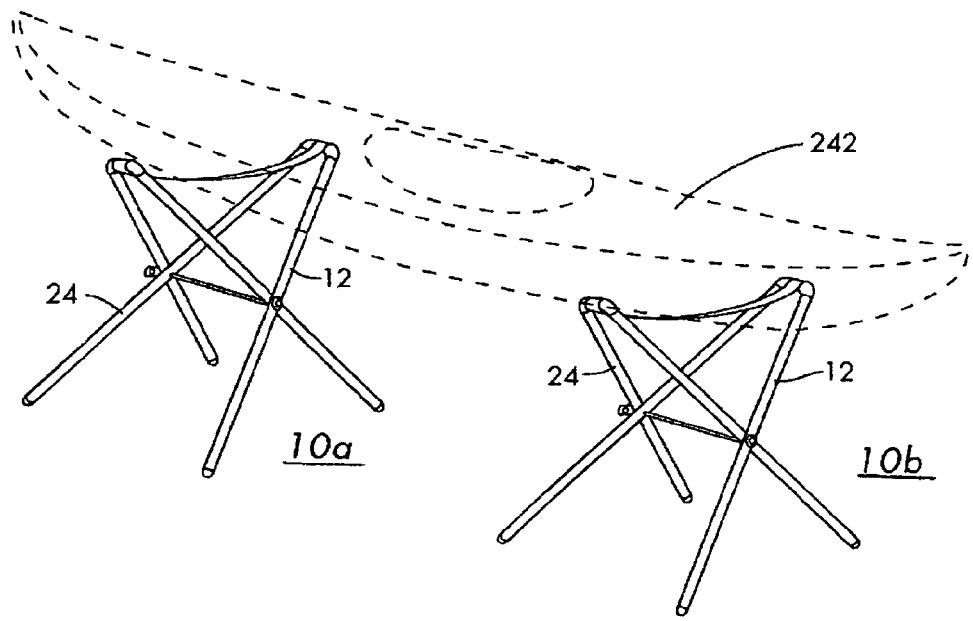
FIG. 24 is a perspective view of a pair of free standing support structures used to support a small boat.
Figure 25:
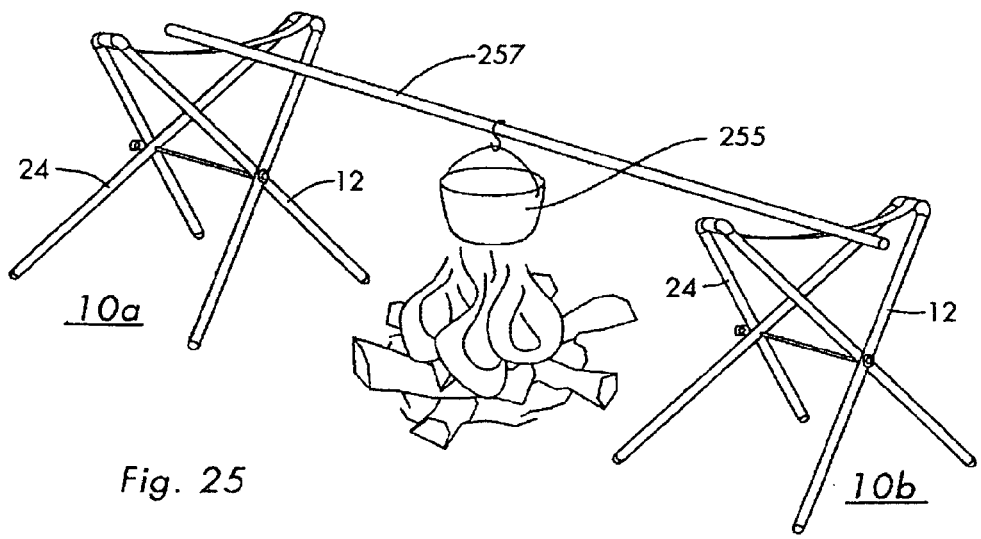
FIG. 25 is a perspective view of a pair of free standing support structures used to cook over an open fire.
Figure 26:
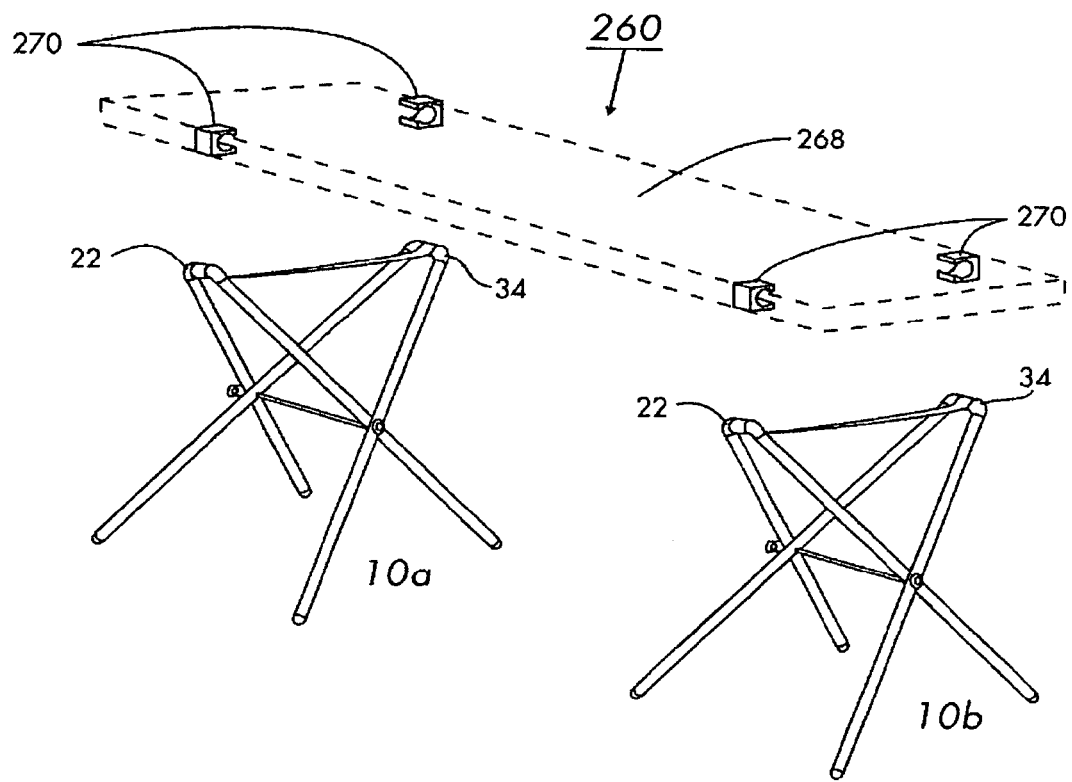
FIG. 26 is a perspective view of a pair of free standing support structures used to support a planar work surface.

FIGS. 24, 25 and 26 demonstrate the utility of structure 10 when implemented as a support system comprising at least two structures 10. As seen in FIG. 24, kayak 242 is elevated off of the ground by freestanding support structures 10*a* and 10*b*. In like manner the same support structure 10 is paired to secure both ends of pole 257 to accommodate the suspension of a cooking vessel 255 above a heat source.

FIG. 26 is a perspective view of a further embodiment of applicant's support structure used in pairs, which provides a scaffold, table, or cot for sleeping. Referring to FIG. 26, structure 260 comprises a first freestanding support structure 10*a* and a second freestanding support structure 10*b*, which are substantially the same as freestanding support structure 10 of FIG. 1. Structures 10*a* and 10*b* are disposed upon a substantially level surface and separated by a horizontal distance slightly less than the length of rigid member 268. Rigid member 268 is made from any flat sheet material which has sufficient structural strength to support the load in the intended use of structure 260, such as wood, plastic, fiberglass, and the like. In the embodiment, rigid member 268 is formed of a sheet of a first rigid material around which is attached a lip of a second rigid material such as for example an aluminum extrusion (not shown) Such a construction is common in the fabrication of lightweight surfaces requiring a high-strength modulus along the longitudinal load bearing axis.

In the embodiment depicted, rigid planar member 268 may be fastened to structures 10*a* and 10*b* by the use of two or more retaining clips 270 disposed on the underside of rigid member 268 and near the perimeter thereof, in which are engaged couplings 34 and 22, respectively, of structure 10*a* and 10*b*.

Figure 27:
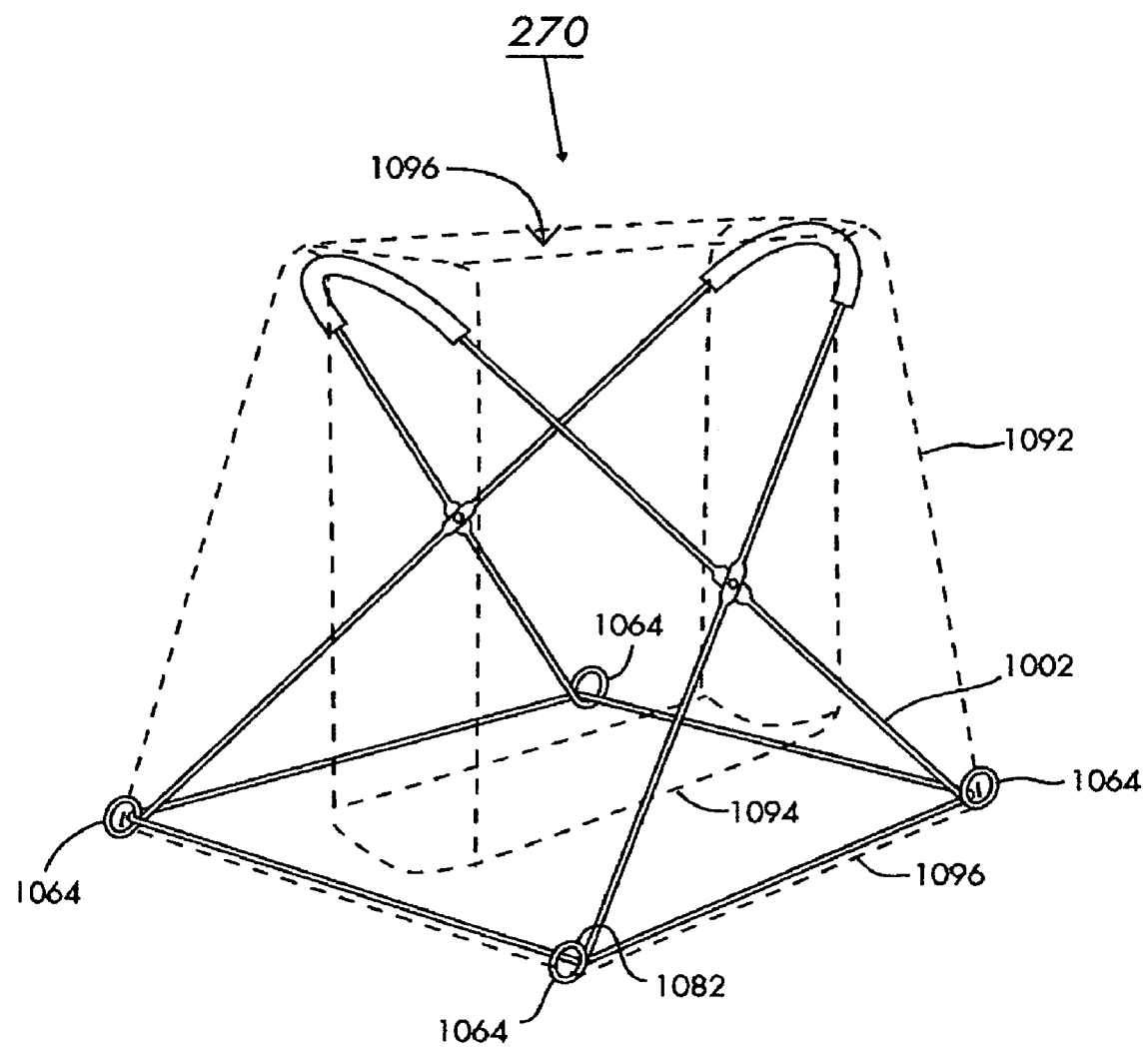
FIG. 27 is a perspective view the free standing support structure in use to hold a plastic bag for refuse collection.

And lastly, as depicted in FIG. 27, a free standing structure can be used as a refuse collection receptacle 270 where an elongated bag 1092 is disposed downwardly through the center volume of wire frame 1002. Lower section 1094 of bag 1092 is disposed upon the ground on which wire frame 1002 rests. Upper section 1096 of bag 1092 is disposed downwardly along the outside of wire frame 1002. In the embodiment, bag 1092 is of sufficient length to allow the edge 1096 of the opening of bag 1092 to be engaged with the ends of pigtail loops 1064. For example, end 1082 of pigtail loop 1064 functions as a clip for the edge 1096 of bag 1092, with each end of pigtail loops 1064 being used in like manner. Thus structure 270 is deployed as a useful device for collection of paper trash, leaves, lawn clippings, raffle tickets, and other lightweight loose debris.

In recapitulation, the present invention is a portable collapsible device having a compact rectangular shape when collapsed, and a useful free standing structure when opened.

It is, therefore, apparent that there has been provided, in accordance with the present invention, a compact, lightweight, inexpensive portable collapsible supporting device. While this invention has been described in conjunction with various embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A support device comprising:
    a first assembly, said first assembly including two struts pivotally connected along a midsection thereof so as to form an angle therebetween; and
    a second assembly having two struts connected to one another so as to form an angle therebetween, said second assembly is connected to the first assembly by at least two coupling members;
    wherein an end of each strut in the first assembly is connected to an end of a corresponding strut in the second assembly at a vertex to form the supporting device, and where each of the coupling members are flexible.

2. The support device of claim 1 wherein the struts within the first and second assemblies pivot about a fulcrum point that is common to a point of connection of the struts.

3. The support device of claim 1 wherein the angular separation between the struts of the first and second assemblies is controlled by an adjustable tensioning member attached to and extending between the struts of said assemblies.

4. The support device of claim 3 wherein said tensioning member is an adjustable cord.

5. The support device of claim 1 further including a load bearing web spanning between vertices where the ends of each strut in the first assembly are connected to the ends of each strut in the second assembly.

6. The support device of claim 5, wherein the web is attached between the coupling members.

7. The support device of claim 1 further comprising a fastening means for releasably securing the first and second assemblies of said support device in the folded configuration.

8. A support device comprising:
    a first assembly, said first assembly including two struts pivotally connected along a midsection thereof so as to form an angle therebetween;
    a second assembly having two struts connected to one another so as to form an angle therebetween, wherein an end of each strut in the first assembly is connected to an end of a corresponding strut in the second assembly at a vertex to form the supporting device, and where the first assembly and second assembly are collapsible so that the struts thereof are substantially parallel and in close proximity to one another in a folded configuration; and
    a fastening means for releasably securing the first and second strut assemblies of said support device in the folded configuration, where the fastening means is also a tensioning member attached to and extending between the struts of said assemblies, which limits the angular separation between said strut assemblies.

9. The support device of claim 1 further including a load supported by the vertices formed between the first and second strut assemblies, wherein the load is selected from the group consisting of:
 a user at least partially supported thereby;
 a sign;
 a piece of recreational equipment;
 a personal watercraft;
 a kayak;
 a canoe;
 a saddle;
 a work surface;
 a planar work surface;
 a table top; and
 camping equipment.

10. The support device of claim 9 wherein the load is supported by a rigid cross bar spanning the vertices.

11. A work support system and a load supported thereon, comprising:
 at least two supporting devices, each supporting device including
 a first assembly, said first assembly including two struts pivotally connected along a midsection thereof so as to form an angle therebetween;
 a second assembly having two struts connected to one another so as to form an acute angle therebetween, wherein an end of each strut in the first assembly is connected to an end of each strut in the second assembly at a vertex to form the supporting device; and
 a web spanning between vertices where the ends of each strut in the first assembly are connected to the ends of each strut in the second assembly;
 wherein the load is positioned so as to be supported by the supporting devices.

12. The work support system of claim 11 wherein the web of each supporting device provides at least partial support for the load.

13. The work support system of claim 12 wherein said load is a kayak.

14. The work support system of claim 11 wherein the load is a horizontal planar surface and where the surface includes means for interlocking the surface to the supporting devices.

15. A method for constructing a collapsible, portable support device, comprising;
 creating a first assembly including two struts by pivotally connecting the struts along a midsection thereof so as to form an angle therebetween;
 creating a second assembly using two struts by connecting one to the other so as to form an acute angle therebetween;
 using a flexible coupling, connecting an end of each strut in the first assembly to an end of each strut in the second assembly at a vertex to form the supporting device; and
 attaching a load bearing web to the flexible coupling at each vertex, wherein the web spans between vertices.

* * * * *